United States Patent
Kamiya et al.

(10) Patent No.: US 10,495,222 B2
(45) Date of Patent: Dec. 3, 2019

(54) AUTOMATIC TRANSMISSION CONTROL DEVICE AND CONTROL METHOD

(71) Applicants: JATCO Ltd, Fuji-shi, Shizuoka (JP); NISSAN MOTOR CO., LTD., Yokohama-shi, Kanagawa (JP)

(72) Inventors: Kohei Kamiya, Yamato (JP); Tomoaki Honma, Isehara (JP); Yasuhiro Endo, Kanagawa (JP)

(73) Assignees: JATCO LTD, Fuji-Shi (JP); NISSAN MOTOR CO., LTD., Yokohama-Shi (JP)

(*) Notice: Subject to any disclaimer, the term of this patent is extended or adjusted under 35 U.S.C. 154(b) by 99 days.

(21) Appl. No.: 15/563,028

(22) PCT Filed: Feb. 22, 2016

(86) PCT No.: PCT/JP2016/054973
§ 371 (c)(1),
(2) Date: Sep. 29, 2017

(87) PCT Pub. No.: WO2016/158077
PCT Pub. Date: Oct. 6, 2016

(65) Prior Publication Data
US 2018/0372220 A1    Dec. 27, 2018

(30) Foreign Application Priority Data
Mar. 30, 2015 (JP) .................. 2015-069963

(51) Int. Cl.
*F16H 61/662* (2006.01)
*F16H 59/18* (2006.01)
(Continued)

(52) U.S. Cl.
CPC ....... *F16H 61/66259* (2013.01); *F16H 59/18* (2013.01); *F16H 59/42* (2013.01);
(Continued)

(58) Field of Classification Search
None
See application file for complete search history.

(56) References Cited

U.S. PATENT DOCUMENTS 5,468,196 A    11/1995    Minowa et al.
5,616,100 A    4/1997    Sakai et al.
(Continued)

FOREIGN PATENT DOCUMENTS

| JP | S63-182352 U | 11/1988 |
|---|---|---|
| WO | WO-2015/064376 A1 | 5/2015 |
| WO | WO-2016/006421 A1 | 1/2016 |

OTHER PUBLICATIONS

U.S. Appl. No. 15/563,326, filed Sep. 29, 2017, JATCO LTD et al.
(Continued)

*Primary Examiner* — Justin Holmes
(74) *Attorney, Agent, or Firm* — Foley & Lardner LLP

(57) ABSTRACT

A control device for an automatic transmission includes: a transmission gear ratio control section configured to control the transmission gear ratio so that a rotation speed of the output element rapidly becomes closer to a rotation speed of the internal combustion engine, a first engagement control section configured to perform a first engagement control to be brought to the full engagement state after the rotation of the internal combustion engine is increased in the slip engagement state while a torque transmission capacity of the lockup clutch is increased when the lockup clutch is switched through the slip engagement state to the full engagement state by an ON operation of an accelerator of the vehicle, the transmission gear ratio control being prohibited during the first engagement control by the first engagement control section.

8 Claims, 6 Drawing Sheets

(51) Int. Cl.
*F16H 59/42* (2006.01)
*F16H 61/14* (2006.01)
*F16H 59/46* (2006.01)
F16H 59/36 (2006.01)
F16H 61/16 (2006.01)

(52) U.S. Cl.
CPC ........... F16H 59/46 (2013.01); F16H 61/143 (2013.01); *F16H 2059/366* (2013.01); *F16H 2059/462* (2013.01); *F16H 2059/467* (2013.01); *F16H 2061/163* (2013.01)

(56) References Cited

U.S. PATENT DOCUMENTS

| | | | |
|---|---|---|---|
| 2012/0060486 A1* | 3/2012 | Yamada | F16H 61/0025 60/459 |
| 2012/0245805 A1 | 9/2012 | Yamaguchi et al. | |
| 2014/0129103 A1 | 5/2014 | Tohta et al. | |
| 2015/0045183 A1 | 2/2015 | Aichi et al. | |
| 2018/0354495 A1* | 12/2018 | Kumazaki | B60W 20/30 |

OTHER PUBLICATIONS

Non-Final Office Action issued in U.S. Appl. No. 15/563,326 dated May 23, 2019 (8 pages).

Notice of Allowance on U.S. Appl. No. 15/563,326 dated Sep. 12, 2019.

\* cited by examiner

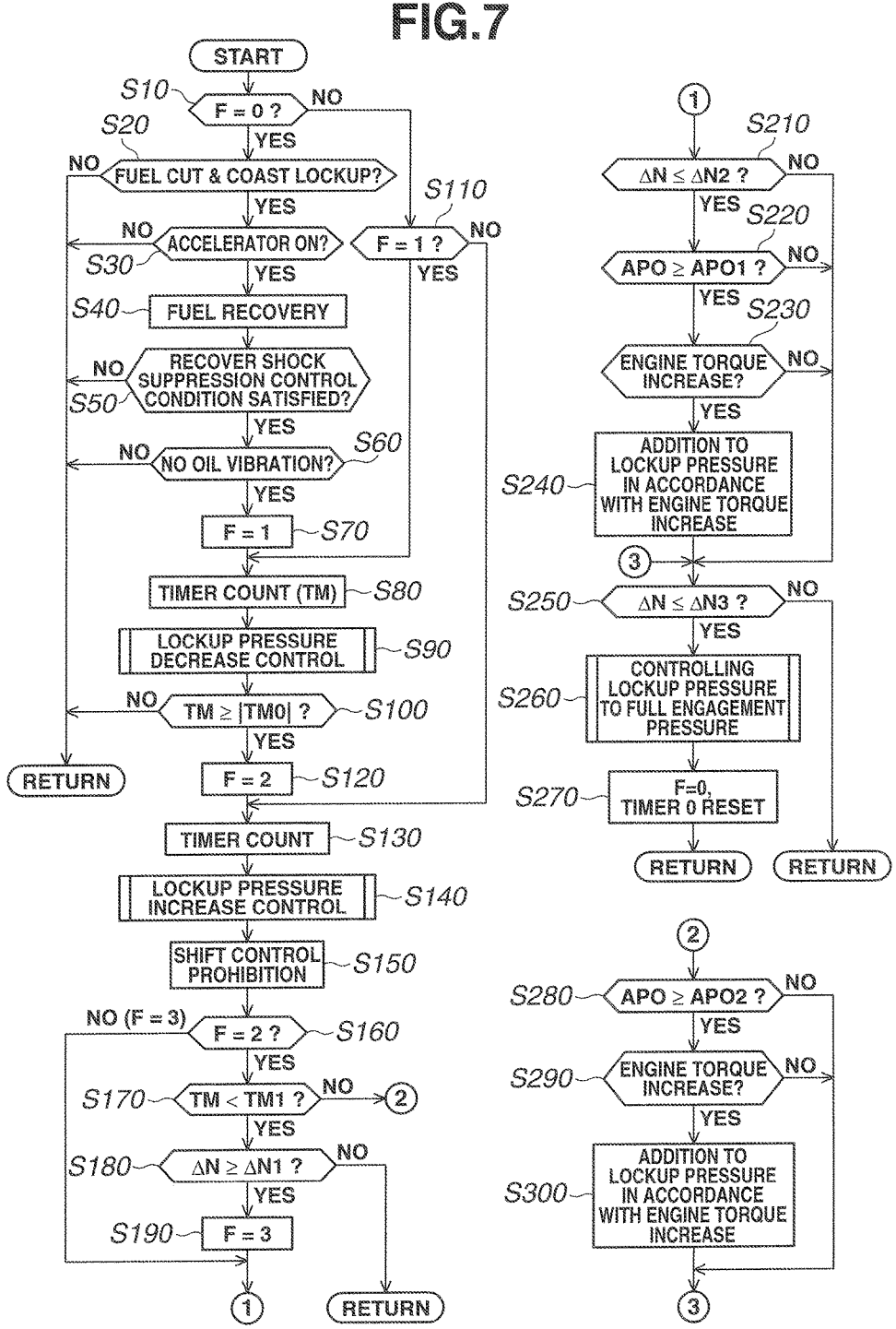

AUTOMATIC TRANSMISSION CONTROL DEVICE AND CONTROL METHOD

TECHNICAL FIELD

This invention relates to a control of an automatic transmission which is mounted on a vehicle, and includes a torque converter with a lockup clutch.

BACKGROUND ART

An automatic clutch of a vehicle such as an automobile often includes a torque converter which is disposed between an engine and an automatic transmission, and which has a lockup clutch. A patent document 1 discloses the control of the lockup clutch configured to prohibit a full engagement (lockup) of the lockup clutch when an accelerator is switched to an ON state at the lockup (that is, a coast lockup) during a coast traveling by an accelerator OFF, for avoiding a large torque shock generated by an operation of a reverse torque in which a torque transmission direction is reversed.

As described above, when the accelerator is switched to the ON state at the coast lockup and the full engagement of the lockup clutch is prohibited, the lockup clutch is brought to a full disengagement state or a slip engagement state so as to avoid the torque shock. Then, the control is performed to rapidly bring the lockup clutch to the full engagement state (drive lockup) again. This is effective for improving the fuel consumption.

When the accelerator is switched to the ON state in a state where the lockup clutch is disengaged or slip-engaged, the engine speed is increased, and the engine torque is increased and transmitted by the torque converter. Accordingly, a rotation speed of a turbine runner (turbine rotation speed) is also increased, so that the vehicle is accelerated or started. Then, the lockup clutch is fully engaged.

When the lockup clutch is disengagement state, the lockup clutch is firstly slip-engaged when the disengaged lockup clutch is engaged. With this, a rotation speed difference between input and output elements of the lockup clutch (a rotation speed difference between the engine speed and the turbine rotation speed) is decreased. Then, the lockup clutch is shifted to the full engagement state. Besides, in a process to the full engagement state, a clutch judder in which a forward and rearward G of the vehicle is vibrated (judder vibration) is often generated.

The judder vibration is caused by a variation of a difference between a static friction coefficient and a dynamic friction coefficient. In particular, in a case where the automatic transmission is the continuously variable transmission, when the continuously variable transmission is upshifted in accordance with the increase of the turbine rotation speed, the turbine rotation speed is suppressed. Accordingly, the engagement control decreases the engine rotation speed towards the turbine rotation speed. Therefore, the torque increase function of the torque converter is largely varied, so that the engine load is largely varied. The amplitude of the judder vibration becomes large.

Moreover, the causes of the generation of the judder vibration are the magnitude of the rotation speed difference, the relationship between the engine torque and the transmission torque capacity of the lockup clutch (corresponding to the engagement pressure of the lockup clutch). For example, when the engine torque is increased by an additional depression of the accelerator pedal at a timing at which the rotation speed difference becomes small immediately before the full engagement of the lockup clutch, the transmission torque capacity of the lockup clutch with respect to the engine torque is deficient. With this, it is not possible to attain the smooth shift to the full engagement to cause the judder vibration.

It is, therefore, an object to provide a control device for an automatic transmission to dissolved the above-described problems, and to avoid a judder vibration generated due to a torque increase of a driving source at a transition to a lockup state.

PRIOR ART DOCUMENT

Patent Document

Patent Document 1: Japanese Utility Model Application Publication No. 63-182352

SUMMARY OF THE INVENTION (1) For attaining the above-described object, in the present invention, A control device for an automatic transmission including a continuously variable transmission mechanism, an input element disposed between an internal combustion engine being a driving source of a vehicle and the continuously variable transmission, and arranged to rotate as a unit with the internal combustion engine, an output element arranged to rotate as a unit with an input shaft of the continuously variable transmission, and a torque converter having a lockup clutch disposed between the input element and the output element, the control device comprises: a control means configured to control an engagement state of the lockup clutch and a transmission gear ratio of the continuously variable transmission mechanism in accordance with a traveling state of the vehicle; a rotation sensing means configured to sense a rotation speed difference between the input and output elements of the lockup clutch; and a torque sensing means configured to sense an output torque of the internal combustion engine; the control means including; a transmission gear ratio control section configured to perform a transmission gear ratio control to control the transmission gear ratio so that a rotation speed of the output element rapidly becomes closer to a rotation speed of the internal combustion engine when the sensed rotation speed difference sensed by the rotation sensing means becomes equal to or smaller than a predetermined value in a case where the lockup clutch is switched through a slip engagement to a full engagement, a first engagement control section configured to perform a first engagement control to be brought to the full engagement state after the rotation of the internal combustion engine is increased in the slip engagement state while a torque transmission capacity of the lockup clutch is increased when the lockup clutch is switched through the slip engagement state to the full engagement state by an ON operation of an accelerator of the vehicle, the transmission gear ratio control being prohibited during the first engagement control by the first engagement control section.

(2) It is preferable that the control means includes a torque judging section configured to judge whether or not the torque sensing means senses the increase of the output torque of the internal combustion engine; and a second engagement control section configured to perform a second control to add a predetermined capacity to the increased torque transmission capacity when the torque judging section judges an increase of the output torque of the internal combustion engine in a state where a sensed rotation speed difference sensed by the rotation sensing means during the first engagement control is increased to be equal to or greater than a first predetermined value after a start of the control, and then decreased to be equal to or smaller than a second predetermined value smaller than the first predetermined value.

(3) It is preferable that the first engagement control is a control to temporarily switch the lockup clutch to the slip engagement state by the ON operation of the accelerator from the coast lockup state of the vehicle, and then to return the full engagement state by increasing the torque transmission capacity of the lockup clutch.

(4) It is preferable that the second engagement control section is configured to add a predetermined capacity to the increased torque transmission capacity when the torque judging section judges the increase of the torque after a predetermined time period in a case where the increase of the sensed rotation speed difference to the first predetermined value or more is not generated during a predetermined time period after a start of the first engagement control.

(5) It is preferable that the predetermined capacity is set in accordance with an increase state of the torque.

(6) It is preferable that the control means is configured to perform the first engagement control; and when the sensed rotation speed difference becomes equal to or smaller than a third predetermined value smaller than the second predetermined value, the control means is configured to increase an increase rate of the increased torque transmission rate, so that rotation speed difference between the input and output elements of the lockup clutch is not decreased even when an output of the internal combustion engine becomes maximum.

(7) It is preferable that the control means is configured to perform the second engagement control; and when the sensed rotation speed difference becomes equal to or smaller than a third predetermined value smaller than the second predetermined value, the control means is configured to increase an increase rate of the increased torque transmission rate, so that rotation speed difference between the input and output elements of the lockup clutch is not decreased even when an output of the internal combustion engine becomes maximum.

BENEFIT OF THE INVENTION

In the present invention, when the first engagement control is performed, the transmission gear ratio control to control the transmission gear ratio of the continuously variable transmission so that the rotation speed of the output element is rapidly closer to the rotation speed of the internal combustion engine (for example, when the transmission gear ratio is fixed before this transmission gear ratio control, the control is performed so that the rotation speed of the output element is rapidly closer to the rotation speed of the internal combustion engine, relative to the case where the transmission gear ratio is fixed) is prohibited. Accordingly, it is possible to stably perform the first engagement control without varying the difference between the rotation speed of the output element and the rotation speed of the internal combustion engine by this transmission gear ratio control.

Accordingly, it is possible to perform the second engagement control to add the predetermined capacity to the torque transmission capacity of the lockup clutch without difficulty, when the vibration (the judder vibration) may be generated by the frictional state (the increase and the decrease of the frictional force) between the input and output elements in a case where the output torque of the internal combustion engine is increased in a state where the rotation speed difference between the input and output elements of the lockup clutch are closer to each other after the rotation of the internal combustion engine is increased at the first engagement control. The variation of the frictional state is suppressed to avoid the generation of the judder vibration. The lockup clutch is smoothly locked up.

Moreover, when the output torque is increased in a state where the rotation of the internal combustion engine is sufficiently increased, that is, in a state where the rotation speed difference between the input and output elements of the lockup clutch does not become large to be closer to each other in a case where the rotation of the internal combustion engine is increased in the slip engagement by the first engagement control, the vibration (the judder) may be generated by the variation of the frictional state (the increase and the decrease of the frictional force) between the input and output elements. In this case, the predetermined capacity is also added to the torque capacity of the lockup clutch. Accordingly, the variation of the frictional state is suppressed to avoid the generation of the judder. The lockup clutch is smoothly locked up.

The predetermined capacity is set in accordance with the increase state of the internal combustion engine. It is possible to more surely dissolve the variation of the frictional state, and to smoothly lock up the lockup clutch.

BRIEF DESCRIPTION OF DRAWINGS

FIG. 7 is a flowchart for explaining the control performed by the control device for the automatic transmission according to the one embodiment.

DESCRIPTION OF EMBODIMENTS

Hereinafter, an embodiment according to the present invention is explained. Besides, the embodiment described below is merely example. There is no intention to exclude application of various variations and arts which are not described in following embodiment.

[1. Configuration]

Hereinafter, configurations of a driving system and a control system of a vehicle to which a control device for an automatic transmission according to the embodiment explained are explained. Besides, an automatic transmission is a belt type continuously variable transmission (hereafter, referred to also as a belt CVT or CVT) including a belt type continuously variable transmission mechanism (hereinafter, referred to also as a variator) which is a transmission mechanism. The transmission mechanism can be other continuously variable transmission mechanisms such as a toroidal type.

[1.1. Overall System Configuration]

Figure 1:
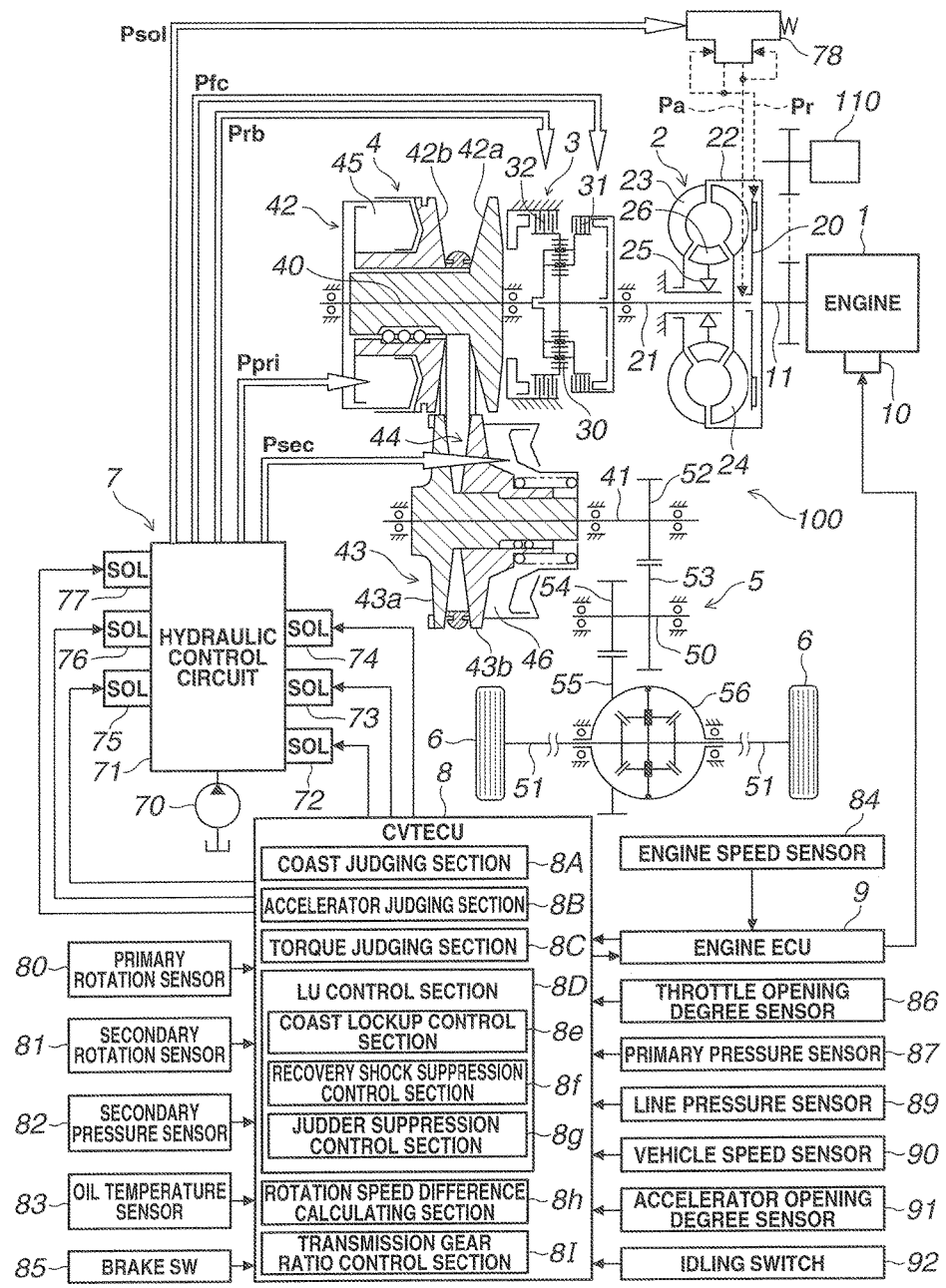
FIG. 1 is an overall configuration view showing a driving system and a control system of a vehicle to which a control device for an automatic transmission according to one embodiment of the present invention is applied.

FIG. 1 is a configuration view showing a driving system and a control system of a vehicle in this embodiment. As shown in FIG. 1, the driving system of the vehicle includes an engine (internal combustion engine) 1, a torque converter 2, a forward and backward switching mechanism 3, a variator 4 being a transmission mechanism, a final speed reduction mechanism 5, and driving wheels 6 and 6. Besides, the torque converter 2, the forward and backward switching mechanism 3, the variator 4, and the final speed reduction mechanism 5 are received within a transmission case, so that a belt continuously variable transmission (CVT) 100 is constituted.

The engine 1 is provided with an output torque control actuator 10 configured to perform an output torque control by an opening and closing actuation of a throttle valve, a fuel cut actuation and so on. With this, the engine 1 is configured to control the output torque by an engine control signal from the outside, in addition to the control of the output torque by the accelerator operation by the driver.

The torque converter 2 is a start element having a torque increase function. The torque converter 2 includes a lockup clutch 20 arranged to directly connect an engine output shaft 11 (=torque converter input shaft) and a torque converter output shaft 21 when the torque increase function is not needed. This torque converter 2 includes, as constituting elements, a pump impeller 23 connected through a converter housing 22 to the engine output shaft 11; a turbine runner 24 connected to the torque converter output shaft 21; and a stator 26 provided through a one way clutch 25 to a case.

Moreover, the lockup clutch 20 is arranged to be switched to one of a lockup state (full engagement state), unlockup state (full disengagement state), and a slip lockup state [clutch slip engagement state, that is, state where the torque is transmitted from the input side to the output side although there is a rotation difference between a rotation speed of a rotation member (input side element) on the input side of the lockup clutch, and a rotation speed of a rotation member of a rotation member (output side element) on the output side of the lockup clutch. The slip lockup state is also referred to as a slip engagement state.], in accordance with a state of the vehicle and a driving state.

This switching control, and a control of a clutch engagement force in the lockup state and the slip lockup state, that is, a control of a torque transmission capacity of the clutch are performed by a control of the supplied hydraulic pressure supplied to the lockup clutch 20. This supplied hydraulic pressure is a pressure difference between two hydraulic chambers (not shown) on the front and rear sides of the lockup clutch 20, that is, a pressure difference (lockup pressure difference) ΔP (Pa−Pr) between a torque converter supply pressure Pa of an apply chamber, and a torque converter disengagement pressure Pr of a release chamber. This supplied hydraulic pressure controls the engagement (including the slip engagement) of the lockup clutch 20. Accordingly, this supplied hydraulic pressure is also referred to as a lockup clutch engagement pressure $P_{LU}$, or is referred to as merely as a lockup pressure $P_{LU}$.

The forward and rearward switching mechanism 3 is a mechanism arranged to switch the input rotation direction to the variator 4 to a normal direction at a forward traveling, and a reverse direction at the rearward traveling. This forward and rearward switching mechanism 3 includes a double pinion planetary gear 30, a forward clutch 31 (forward side frictional engagement element) constituted by a plurality of clutch plates, and a reverse brake 32 (rearward side frictional engagement element) constituted by a plurality of brake plates.

The forward clutch 31 is engaged by a forward clutch pressure Pfc at a selection of a forward traveling range such as a D range (drive range). The reverse brake 32 is engaged by a reverse brake pressure Prb at a selection of an R range (reverse range) which is a rearward traveling range. Besides, the forward clutch 31 and the reverse brake 32 are disengaged at a selection of an N range (neutral range, nontraveling range) by draining the forward clutch pressure Pfc and the reverse brake pressure Prb.

The variator 4 has a continuous shift function to continuously vary a transmission gear ratio which is a ratio between a transmission input rotation speed and a transmission output rotation speed, by varying belt contact radii. The variator 4 includes a primary pulley 42, a secondary pulley 43, and a belt 44. The primary pulley 42 includes a fixed pulley 42a and a slide pulley 42b. The slide pulley 42b is arranged to be moved in an axial direction by a primary pressure Ppri introduced into a primary pressure chamber 45. The secondary pulley 43 includes a fixed pulley 43a and a slide pulley 43b. The slide pulley 43b is arranged to be moved in an axial direction by a secondary pressure Psec introduced into a secondary pressure chamber 46.

Sheave surfaces which are confronting surfaces of the fixed pulley 42a and the slide pulley 42b of the primary pulley 42 form a V shape. Sheave surfaces which are confronting surfaces of the fixed pulley 43a and the slide pulley 43b of the secondary pulley 43 form a V shape. Flank surfaces on both sides of the belt 44 are contacted on these sheave surfaces. Wounding radii of the belt 44 on the primary pulley 42 and the secondary pulley 43 are varied in accordance with movements of the slide pulley 42b and 43b, so that the transmission gear ratio is varied.

The final speed reduction mechanism 5 is arranged to decrease the speed of the transmission output rotation from the transmission output shaft 41 of the variator 4, to give a differential function, and to transmit it to left and right driving wheels 6 and 6. This final speed reduction mechanism 5 is disposed between the transmission output shaft 41, an idler shaft 50, and left and right drive shafts 51 and 51. The final speed reduction mechanism 5 includes a first gear 52 which has a speed reduction function, and which is provided to the transmission output shaft 41; a second gear 53 and a third gear 54 provided to the idler shaft 50; a final speed reduction gear 55; and a differential gear 56 having the differential function.

In the control system of the vehicle, in particular, the control system of the CVT 100 includes a hydraulic control unit 7, and a CVT electric control unit (CVT ECU) 8. Moreover, there is provided an engine electric control unit (engine ECU) 9 configured to transmit and receive information to and from the CVT electric control unit 8. Besides, each of the electric control unit (ECU: Electric Control Unit) 8 and 9 includes an input and output device, a storage device (ROM, RAM, BURAM and so on) in which many control programs are installed, a central processing unit (CPU), a timer counter and so on.

The hydraulic control unit 7 is a control unit configured to produce a primary pressure Ppri introduced into the primary pressure chamber 45, the secondary pressure Psec introduced into the secondary pressure chamber 46, the forward clutch pressure Pfc to the forward clutch 31, the reverse brake pressure Prb to the reverse brake 32, and a solenoid pressure Psol to a lockup control valve 78. This hydraulic control unit 7 includes an oil pump 70, and a hydraulic control circuit 71. The hydraulic control unit 71 includes a line pressure solenoid 72, a primary pressure solenoid 73, a secondary pressure solenoid 74, a forward clutch pressure solenoid 75, a reverse brake pressure solenoid 76, and a lockup solenoid 77.

The line pressure solenoid 72 is arranged to regulate a hydraulic fluid pressurized and transferred by and from the oil pump 70 to a commanded line pressure PL in accordance with a line pressure command outputted from the CVTECU 8.

The primary pressure solenoid 73 is arranged to decrease and regulate the line pressure PL which is the source pressure to a commanded primary pressure Ppri in accordance with a primary pressure command outputted from the CVTECU 8.

The secondary pressure solenoid 74 is configured to decrease and regulate the line pressure PL which is the source pressure to a commanded secondary pressure Psec in accordance with a secondary pressure command outputted from the CVTECU 8.

The forward clutch pressure solenoid 75 is configured to decrease and regulate the line pressure PL which is the source pressure to a commanded forward clutch pressure Pfc in accordance with a forward clutch pressure command outputted from the CVTECU 8.

The reverse brake pressure solenoid 76 is configured to decrease and regulate the line pressure PL which is the source pressure to a commanded reverse brake pressure Prb in accordance with a reverse brake pressure command outputted from the CVTECU 8.

The lockup solenoid 77 is arranged to produce a solenoid pressure Psol which is a command signal pressure to the lockup control valve 78, by a command by a duty signal Duty from the CVTECU 8. The lockup control valve 78 is arranged to produce the torque converter supply pressure and the torque converter release pressure by using the solenoid pressure Psol as the actuation signal pressure, so that the lockup pressure difference $\Delta P$ ($\Delta P = Pa - Pr$) which is a pressure difference of the clutch front and rear hydraulic chambers of the lockup clutch 20 becomes a value based on the command from the CVTECU 8.

The CVTECU 8 performs a line pressure control to output a command for obtaining a target line pressure according to a throttle opening degree and so on to a line pressure solenoid 72, a shift hydraulic control to output a command for obtaining a target transmission gear ratio in accordance with a vehicle speed, the throttle opening degree and so on to the primary pressure solenoid 73 and the secondary pressure solenoid 74, and a forward and rearward switching control to output a command for controlling the engagement and the disengagement of the forward clutch 31 and the reverse brake 32 to the forward clutch pressure solenoid 75 and the reverse brake pressure solenoid 76. Moreover, the CVTECU 8 is configured to output a command to the lockup clutch solenoid 77, and thereby to perform a control such as the engagement, the disengagement, the slip engagement (the clutch slip engagement) and so on of the lockup clutch 20.

The CVTECU 8 is configured to receive sensor information and switch information from a primary rotation sensor 80, a secondary rotation sensor 81, a secondary pressure sensor 82, an oil temperature sensor 83, an engine speed sensor 84, a brake switch 85, a throttle opening degree sensor 86, a primary pressure sensor 87, a line pressure sensor 89, a vehicle speed sensor 90, an accelerator opening degree sensor 91, an idler switch 92, and so on. Moreover, the CVTECU 8 is configured to receive the torque information from the engine ECU 9, and to output a torque request to the engine ECU 9. In this case, an inhibitor switch (not shown) is configured to sense a range position (the D range, the N range, the R range and so on) selected by the operation of the shift lever by the driver, and to output a range position signal according to the range position.

Besides, in this embodiment, the accelerator opening degree sensor 91 is used as a torque sensing means arranged to sense the output torque of the engine 1, in addition to the accelerator state sensing means. However, the throttle opening degree sensor 86 may be used as the torque sensing means. The torque sensing means may be any sensor and so on arranged to sense an amount corresponding to the output torque of the engine 86.

[1.2. Configuration of Control Device of Automatic Transmission]

[1.2.1. Summary of Control]

The control device of the automatic transmission according to this embodiment is configured to perform a control (coast lockup control) to perform a coast lockup to engage the lockup clutch 20 when a predetermined control condition (coast lockup control condition) is satisfied in a case where the vehicle is in a coast state. The control device is configured to perform a control of the temporal release of the lockup (to be brought to the slip engagement state) and a drive lockup after the release of the coast lockup.

Moreover, the control for the drive lockup includes a control of the engagement state of the lockup clutch 2, and a control of the transmission gear ratio of the variator 4. The control of the transmission gear ratio of the variator 4 in the drive lockup is not limited to a timing after the release of the coast lockup. The control of the transmission gear ratio of the variator 4 in the drive lockup is performed when the control condition is satisfied. The control device of the automatic transmission configured to perform these controls is constituted by functional elements provided to the CVTECU 8, and various sensors.

[1.2.2. Control of Lockup Clutch]

Actuation states of the lockup clutch 20 include a lockup state (full engagement state) in which the input and output elements (which is the input and output elements of the lockup clutch 20) of the torque converter 2 are directly connected with each other, a converter state (the unlock state, that is, the fully disengagement state) in which the input and output elements are fully disengaged to transmit the torque through the fluid, and a slip lockup state (slip engagement state) in which the lockup clutch 20 is in the half engagement state to maintain the predetermined slip state between the input and output elements.

In the control of the lockup clutch 20, these three actuation states are varied by varying the engagement pressure $P_{LU}$ of the lockup clutch 20 (=the lockup pressure difference $\Delta P$). In this control, the torque transmission capacity (the engagement capacity) $C_{LU}$ of the lockup clutch 20 is periodically determined (calculated). The lockup clutch engagement pressure $P_{LU}$ is controlled by an open loop control in accordance with this engagement capacity $C_{LU}$.

Besides, in the engagement capacity $C_{LU}$ and the engagement pressure (the lockup pressure) $P_{LU}$ of the lockup clutch 20, the engagement pressure $P_{LU}$ is increased (for example, linearly increased) as the engagement capacity $C_{LU}$ is increased. Accordingly, a conversion map based on this relationship is prepared. With this, it is possible to convert the engagement capacity $C_{LU}$ to the engagement pressure $P_{LU}$ with reference to the conversion map. Then, the obtained engagement pressure $C_{LU}$ is converted to a command value (lockup duty) of the lockup solenoid 77. The lockup solenoid 77 is controlled by the command value so as to control the state of the lockup clutch 20.

In this vehicle, in the coast state of the vehicle where the depression of the accelerator is released (the accelerator OFF), the fuel cut control to stop the fuel injection of the engine by the engine ECU 9 is performed to decrease the fuel consumption. In this case, when the engine speed and the vehicle speed are decreased to control values (specified values), the coast lockup control is performed to prevent the engine stall, and to provide the fuel recovery function to restart the fuel supply to the engine. Accordingly, the fuel cut is simultaneously performed at the coast lockup.

Figure 2:
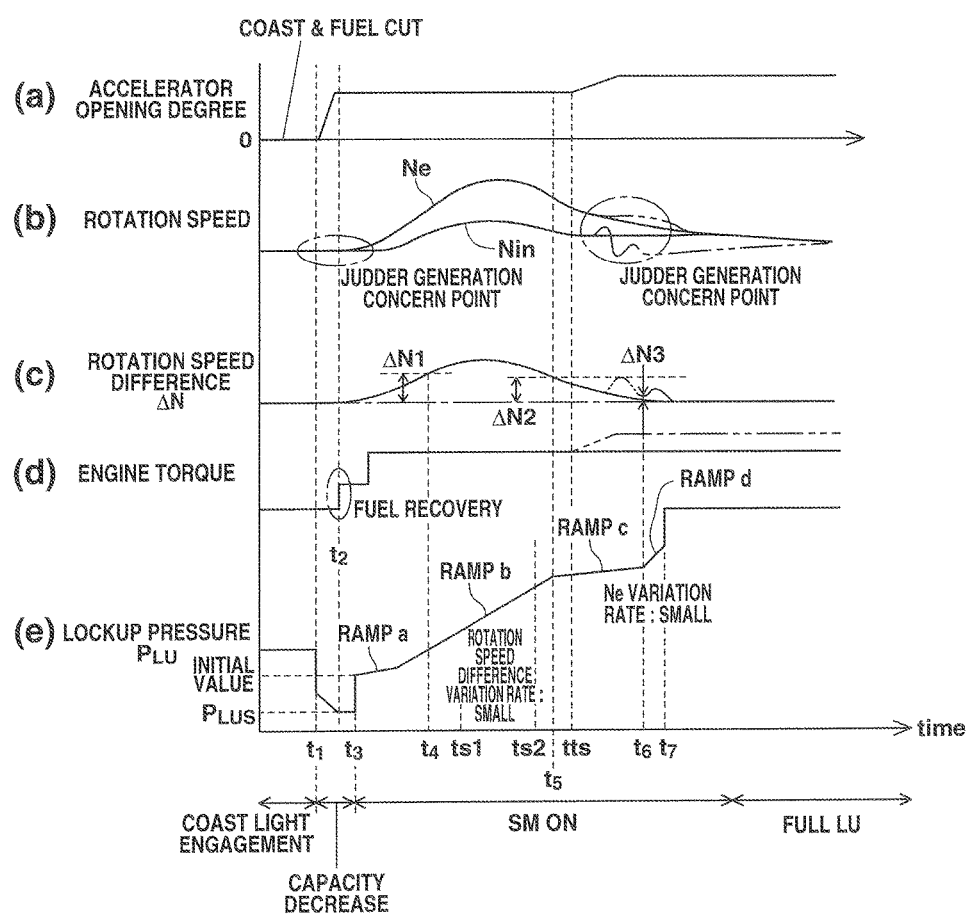
FIG. 2 is a time chart for explaining a condition in which a control is performed by the control device for the automatic transmission according to the one embodiment.

The control relating to the temporal release of the lockup (brought to the slip engagement state) and the drive lockup are performed after the release of the coast lockup. This control is explained with reference to a time chart of FIG. 2. FIG. 2 shows the accelerator opening degree [FIG. 2(a)], the engine speed (engine rotation speed) Ne and the rotation speed (transmission input rotation speed) Nin of the transmission input shaft (=the torque converter output shaft 21) [FIG. 2(b)], the rotation speed difference (referred to also as the rotation speed difference between the input and output elements of the lockup clutch 20, or the slip rotation speed) ΔN [FIG. 2(c)] which is the rotation speed difference (=Ne−Nin) between the engine speed Ne and the transmission input rotation speed Nin, the engine torque [FIG. 2(b)], and the engagement hydraulic pressure of the lockup clutch 20 (the lockup pressure) [FIG. 2(e)] to correspond to the respective control modes.

The input torque to the lockup clutch 20 is slight during the coast lockup during the coast lockup. Accordingly, it is possible to lock up by the small engagement capacity $C_{LU}$. Consequently, the lockup clutch 20 is locked up by the small lockup pressure $P_{LU}$ as shown by "coast light engagement" in FIG. 2. When the accelerator pedal is depressed (the accelerator ON), for example, at a time $t_1$ during this coast lockup, the coast lockup is canceled, and the fuel injection is returned (the fuel recovery). The full engagement of the lockup clutch 20 is temporarily canceled during a minute time period (time period $t_1$ to $t_3$) (brought to the slip engagement). Then, the control is performed toward the state of the full engagement. This control is a recovery shock suppression control (first engagement control in the present invention) to suppress the torque shock (the recovery shock) when the engine torque is inputted by the fuel recovery at time $t_2$. The recovery shock suppression control has a predetermined control condition.

In particular, in this control device, it is supposed that there is the additional depression of the accelerator pedal (that is, the increase of the engine torque) in a process in which the lockup clutch 20 is controlled from the slip engagement to the full engagement. A judder avoiding control (second engagement control in the present invention) to avoid the concern (possibility) of the generation of the judder vibration due to this increase of the engine torque is added. Hereinafter, a configuration relating to these controls are explained.

As shown in FIG. 1, the CVTECU 8 includes, as functional elements, a coast judging section (coast judging means) 8A, an accelerator judging section (accelerator judging means) 8B, a torque judging section (torque judging means) 8C, a rotation speed difference calculating section 8h, a lockup clutch control section 8D configured to control the engagement capacity of the lockup clutch 20 based on the judgment information of the coast judging section 8A, the accelerator judging section 8B, and the torque judging section 8C, and the rotation difference ΔN between the input and output elements of the lockup clutch 20.

The rotation speed difference calculating section 8h is configured to calculate the rotation speed difference ΔN between the input and output elements of the lockup clutch 20 based on the detection information of the engine rotation speed sensor 84 and the primary rotation sensor 80. These rotation speed sensors 84 and 80 and the rotation speed calculating section 8h constitute a rotation speed sensing means arranged to sense the rotation speed difference ΔN. This control device includes the coast judging section 8A, the accelerator judging section 8B, the torque judging section 8C, the rotation speed sensing means 84, 80, and 8h, and the lockup clutch control section 8D.

The coast judging section 8A is configured to judge whether or not the vehicle is in the coast state. This judgment is performed by whether or not the idling switch 92 is in the ON state. However, this judgment may be performed by whether or not the accelerator opening degree sensor 91 is smaller than a predetermined minute value near zero. Moreover, this judgment may be performed based on a ratio between the engine speed (the impeller rotation speed of the torque converter and the rotation speed of the transmission input shaft (the turbine rotation speed of the torque converter).

The accelerator judging section 8B is configured to judge the depression and the depression return of the accelerator pedal, the accelerator ON, and the accelerator OFF based on the detection information APO from the accelerator opening degree sensor 91 which is the accelerator state sensing means, and to judge whether or not the accelerator opening degree APO is equal to or greater than a control reference value which is previously set, based on the detection information APO. For example, when the accelerator opening degree APO sensed by the accelerator opening degree sensor 91 is increased, the depression (the additional depression) of the accelerator pedal is judged. When the sensed accelerator opening degree APO is decreased, the depression return of the accelerator pedal is judged. Furthermore, when the value of the detection information from the accelerator opening degree sensor 91 is equal to or greater than a minute judgment threshold value, the accelerator ON is judged. When the value of the detection information APO from the accelerator opening degree sensor 91 is smaller than the minute judgment threshold value, the accelerator OFF is judged.

Besides, the depression of the accelerator pedal, the depression return of the accelerator pedal, the accelerator ON, and the accelerator OFF are judged by performing a low pass filter processing such as a moving average or smoothing to the detection information from the accelerator opening degree sensor 91, so as to judge without influence of the noise and so on. The threshold value relating to the judgment of the accelerator ON and the accelerator OFF is the minute value near the opening degree 0. Accordingly, the judgment of the accelerator OFF needs time period longer than the judgment of the accelerator ON, with respect to the normal accelerator operation. Furthermore, when the idling switch 92 is in the OFF state, the accelerator ON may be judged based on the detection information from the idling switch 92. When the idling switch 92 is in the ON state, the accelerator OFF may be judged based on the detection information from the idling switch 92.

The torque judging section 8C is configured to judge whether or not the output torque of the engine 1 is increased. In this embodiment, the accelerator opening degree relates to the output torque of the engine 1. Accordingly, the accelerator opening degree sensor 91 is used as the torque sensing means. The torque judging section 8C judges that the output torque is increased when the accelerator opening degree is increased to be equal to or greater than the reference amount.

The lockup clutch control section 8D includes a function (coast lockup control section) 8e configured to perform the coast lockup control to bring the lockup clutch 20 to the lockup state during the coast traveling of the vehicle; a function (recovery shock suppression control section) configured to suppress the fuel recovery shock when the accelerator is switched to the ON state during the coast lockup control; and a function (judder avoidance control section) 8e configured to perform the judder avoidance control to avoid the concern (possibility) of the generation of the judder vibration due to the increase of the engine torque at the recovery shock suppression control.

[1.2.2.1 Coast Lockup Control]

The coast lockup control section 8e is configured to judge whether or not predetermined coast lockup conditions including the judgment of the coast traveling state of the vehicle by the coast judging section 8A is satisfied. When the conditions are satisfied, the coast lockup control by which the lockup clutch 20 is locked up (the full engagement) by the low lockup pressure $P_{LU}$ is performed as described above.

As described above, the coast lockup control is for providing the fuel recovery function to prevent the engine stall, and to restart the fuel supply to the engine, at the fuel cut which is performed by the judgment of the coast state of the vehicle by the coast judging section 8A. When the engine speed and the vehicle speed is sufficiently high, the concern (possibility) of the engine stall is low even in the torque converter state in which the lockup clutch 20 is released (disengaged), so as to maintain the fuel recovery function. Accordingly, the coast lockup conditions include a condition that it is judged that the vehicle is in the coast state, a condition that the engine speed Ne is smaller than the set rotation speed Ns1, and a condition that the vehicle speed VSP is smaller than the set vehicle speed VSPs.

[1.2.2.2. Recovery Shock Suppression Control]

The recovery shock suppression control section 8f is configured to judge whether or not the predetermined recovery shock suppression conditions are satisfied. When the recovery shock suppression control section 8f judges that the predetermined recovery shock suppression conditions are satisfied, the recovery shock suppression control section 8f performs the recovery shock suppression control.

This recovery shock provides the unnatural feeling at the low vehicle speed. However, this recovery shock does not provide the unnatural feeling at the high vehicle speed. Accordingly, the control conditions of the recovery shock includes a condition that the vehicle speed at the cancel of the coast lockup is equal to or smaller than a previously set vehicle speed. Moreover, in this embodiment, the control conditions of the recovery shock include a condition that the hydraulic system to which the lockup pressure is added is not a state where the oil vibration is generated, in addition to the above-described vehicle speed condition.

For example, when the line pressure grasped from the primary pressure and the secondary pressure becomes equal to or lower than the predetermined pressure, the oil vibration is easy to be generated. Accordingly, it is possible to judge whether or not the oil vibration is generated from this hydraulic pressure condition. In the recovery shock control, the lockup clutch 20 is returned to the full engagement after the lockup clutch 20 is once brought to the slip engagement state. Consequently, when this control is performed in a condition where the oil vibration is generated, the judder may be generated due to the unstable hydraulic pressure. Therefore, the control conditions include the condition that it is not the state where the oil vibration is generated.

As shown in FIG. 2, in the recovery shock suppression control, firstly, the torque shock due to the fuel recovery is suppressed by the slip engagement by the decrease control (the lockup pressure decrease control) of the engagement capacity of the lockup clutch 20 in a predetermined ramp state. Then, after the suppression of the torque shock, the engine restarted by the fuel recovery is increased (suddenly increased) to some degree by the control (the lockup pressure increase control) to increase the engagement capacity amount $C_{LU}$ of the lockup clutch 20. The rotation speed difference ΔN between the input and output rotation elements of the lockup clutch 20 is decreased while receiving the increased torque of the engine. When the rotation speed difference ΔN becomes equal to or smaller than a third predetermined value ΔN3 which is a minute engagement judgment reference value near 0, the lockup clutch 20 is fully engaged. Besides, a process until this full engagement is the recovery suppression control.

Specifically, the engagement pressure $P_{LU}$ (the engagement capacity $C_{LU}$) of the lockup clutch 20 is decreased during a short time period (time period $t_1$ to $t_3$). In this case, at time $t_1$, the engagement pressure $P_{LU}$ (the engagement capacity $C_{LU}$) is instantaneously decreased to a middle pressure (middle capacity) higher than the slip control engagement pressure $P_{LUS}$ (the slip control capacity $C_{LUS}$). Then, the engagement pressure $P_{LU}$ is decreased to the slip control engagement pressure $P_{LUS}$ (the slip control capacity $C_{LUS}$) in a ramp state, so as not to cause the disengagement of the lockup clutch 20 due to the overshooting. Then, the slip control engagement pressure $P_{LUS}$ (the slip control capacity $C_{LUS}$) is held.

With this, the lockup clutch 20 is brought to the slip engagement state (time $t_3$). The engagement capacity $C_{LU}$ is increased by increasing the engagement pressure (the lockup pressure) $P_{LU}$ of the lockup clutch 20. In this process, when the increase of (the engagement capacity $C_{LU}$ of) the lockup clutch 20 is suddenly performed, the engagement shock is caused at the lockup (the full engagement) to deteriorate the ride quantity of the vehicle. Accordingly, when the lockup clutch 20 is brought to the lockup state, the engagement pressure $P_{LU}$ (the engagement capacity $C_{LU}$) is gradually increased, and a control (smooth-on control, SM ON) to smoothly shift to the lockup is performed.

This smooth-on control is performed as follows for improving the fuel economy by rapidly finishing the lockup while preventing the engagement shock. As shown in FIG. 2, firstly, an initial value (smooth-on initial value) is provided to the engagement pressure $P_{LU}$. Then, the engagement pressure $P_{LU}$ is increased in a stepped state, and then increased in the ramp state. The smooth-on initial value is for starting the lockup clutch 20 being the slip state toward the engagement side to hold the gap of the clutch to 0. The smooth-on initial value is set to a value by which the gap (backlash) is not generated in the lockup clutch 20.

In a process of the gradual increase in the ramp state (the ramp control), firstly, the gradual increase is performed at a ramp a having a relatively small increase rate so as to suddenly increase the rotation of the engine 1. Then, the gradual increase is performed at a ramp b having a relatively large increase rate. The sudden increase is suppressed by the ramp b. Then, it is switched to the ramp c so as to gradually increase the engagement pressure $P_{LU}$. With this, the motion of the lockup clutch 20 started toward the engagement side is settled to avoid the concern (possibility) of the sudden engagement. By suddenly increasing the rotation of the engine 1, the rotation speed difference (the slip rotation speed) ΔN between the input and output elements of the torque converter 2 becomes equal to or greater than the first predetermined value ΔN1 (time $t_4$). Then, the rotation speed difference ΔN between the input and output elements of the torque converter 2 becomes smaller than the first predetermined value ΔN while receiving the engine torque increased by the sudden increase. When the rotation speed difference ΔN becomes equal to or smaller than ΔN2 smaller than the first predetermined value ΔN1 (time $t_5$), the ramp is switched to a ramp c having an appropriate increase rate by which the excessive time period is not needed for the engagement, and by which the concern (the possibility) of the sudden engagement is avoided. The engagement pressure $P_{LU}$ is increased by this ramp c.

Besides, it is supposed that the rotation speed difference ΔN becomes equal to or greater than a first predetermined value ΔN1 (the first predetermined value ΔN1 or more at time $t_4$) within a predetermined time period (first predetermined time period) after the start of the recovery shock suppression control.

Moreover, the control start conditions of the judder avoidance control include the sudden increase of the speed of the engine 1. In this case, it is judged that the sudden increase of the engine 1 is finished when the rotation speed difference ΔN becomes equal to or greater than the first predetermined value ΔN1. However, for example, when the state of the small accelerator opening degree APO is continued after the start of the recovery shock suppression control, the speed of the engine is not suddenly increased as shown in FIG. 2. The rotation speed difference ΔN does not become equal to or greater than the first predetermined value ΔN1 within the first predetermined time period after the start of the recovery shock suppression control. In this case, it is presumed that the speed of the engine 1 is not suddenly increased due to some causes (the response delay of the hydraulic pressure of the lockup clutch 20, the torque response delay of the engine 1, and so on). It is supposed that the speed of the engine 1 is suddenly increased at a timing after the first predetermined time period is elapsed, and that one of the control start conditions of the judder avoidance control is satisfied.

When the rotation speed difference (the slip rotation speed) ΔN between the input and output elements of the torque converter 2 becomes equal to or smaller than the third predetermined value ΔN3 by the ramp control (time $t_6$), the ramp is switched to a ramp d having an increase rate by which the increase of the slip amount is avoided even when the torque of the engine 1 becomes maximum. The engagement pressure $P_{LU}$ is increased during the predetermined time period by this ramp d. After the predetermined time period, it is supposed that it is completely switched from the slip state to the lockup state (time $t_7$). The engagement pressure $P_{LU}$ is stepwisely increased so as to surely hold the lockup state. Besides, this judgment of the lockup state is performed by the calculated slip rotation speed ΔN which is filtered for the noise canceling.

Besides, when the torque capacity (the engagement capacity) $C_{LU}$ transmitted by the lockup clutch 20 becomes greater than the input torque (in this case, the engine torque) inputted to the torque converter 2 (that is, the lockup clutch 20), the lockup clutch 20 is switched from the slip state to the lockup state. This switching timing of the lockup clutch 20 is dependent on the input torque Te. That is, even when the engagement capacity $C_{LU}$ is not increased in the slip state, the lockup clutch 20 is switched to the lockup state when the input torque Te is decreased. Even when the engagement capacity $C_{LU}$ of the lockup clutch 20 is increased, the lockup clutch 20 is hard to be switched to the lockup state when the input torque Te is increased.

[1.2.2.3. Judder Avoidance Control]

The judder control section 8g is configured to judge whether or not predetermined judder avoidance control conditions are satisfied. The judder avoidance control performs the judder avoidance control when the conditions are satisfied.

The judder avoidance control includes a first judder avoidance control and a second judder avoidance control. The first judder avoidance control is performed when the sudden increase of the rotation of the engine 1 is judged in a case where the rotation speed difference ΔN is equal to or greater than the first predetermined value ΔN1 during the first predetermined time period after the start of the recovery shock suppression control, and subsequently (in this case, after a timing (time ts2 shown in FIG. 2) at which the second predetermined time period is elapsed) when the rotation speed difference ΔN becomes equal to or smaller than the second predetermined value ΔN2. The second judder avoidance control is performed when it is presumed that the sudden increase of the speed of the engine 1 is increased at the timing after the first predetermined time period in a case where the rotation speed difference ΔN does not become equal to or greater than the first predetermined value ΔN1 within the first predetermined time period after the start of the recovery shock suppression control.

As described above, when the engine torque is increased at a timing at which the rotation speed difference ΔN between the input and output elements of the lockup clutch 20 becomes small immediately before the full engagement, in a process in which the lockup clutch 20 is controlled from the slip engagement to the full engagement by the recovery shock suppression control, the judder vibration may be generated. The judder avoidance control is a control for preventing the above-described judder vibration.

This state where the judder vibration may be generated is a case the engine torque is definitely increased (in this case, the accelerator opening degree is definitely increased) in a state where the accelerator opening degree APO is equal to or greater than a predetermined value APO1 (that is, the engine torque is equal to or greater than a predetermined value) in a process in which it is controlled from the slip engagement to the full engagement. Accordingly, the conditions of the judder avoidance control includes a condition that the accelerator opening degree APO is the predetermined value APO1, and that the engine torque is increased to be equal to or greater than the predetermined value (for example, the increase amount per unit time is equal to or greater than the predetermined value, or the increase rate is equal to or greater than the predetermined value).

Specifically, when the engine torque is increased from a state where the accelerator is depressed to a some degree, at a timing at which the rotation speed difference ΔN is decreased immediately before the control to the full engagement pressure after the sudden increase of the rotation of the engine 1, in a stage in which the rotation speed difference ΔN becomes equal to or smaller than the second predetermined value ΔN2, that is, when the engine torque is increased in a state where the rotation speed difference ΔN of the input and output elements of the lockup clutch is small to a some degree, the judder vibration may be generated by the variation (the increase and the decrease of the frictional force) of the frictional state between the input and output elements, as shown in FIG. 2.

The judder avoidance control section 8 performs the first judder avoidance control for dissolving the concern (the possibility) of the above-described judder vibration. Accordingly, the control condition of the first judder avoidance control is a condition that rotation speed difference ΔN between the input and output elements of the lockup clutch 20 becomes equal to or smaller than the second predetermined value ΔN2 after the sudden increase of the rotation of the engine 1, and that the engine torque is increased in a state where the accelerator opening degree APO is equal to or greater than the predetermined value APO1.

Moreover, it is shifted from the coast lockup control to the recovery shock suppression control by the depression of the accelerator pedal. However, for example, in a case where the accelerator opening degree APO is small so that the rotation speed difference ΔN does not become equal to or greater than the first predetermined value ΔN1, and where the sudden increase of the rotation of the engine 1 is presumed at a timing at which the first predetermined time period is elapsed, the judder vibration may be generated due to the variation (the increase and the decrease of the frictional force) of the frictional state between the input and output elements when the engine torque is increased.

The judder avoidance control 8g performs the second judder avoidance control for dissolving the concern (the possibility) of the above-described judder vibration. The control conditions of the judder avoidance control in this case include a condition that the rotation speed difference ΔN between the input and output elements of the lockup clutch 20 is smaller than the predetermined value ΔN1, and that the engine torque is increased in a state where the accelerator opening degree APO is equal to or greater than the predetermined value APO2, in a case where it is presumed that the engine 1 is suddenly increased at a time at which the first predetermined time period is elapsed.

Figure 3:
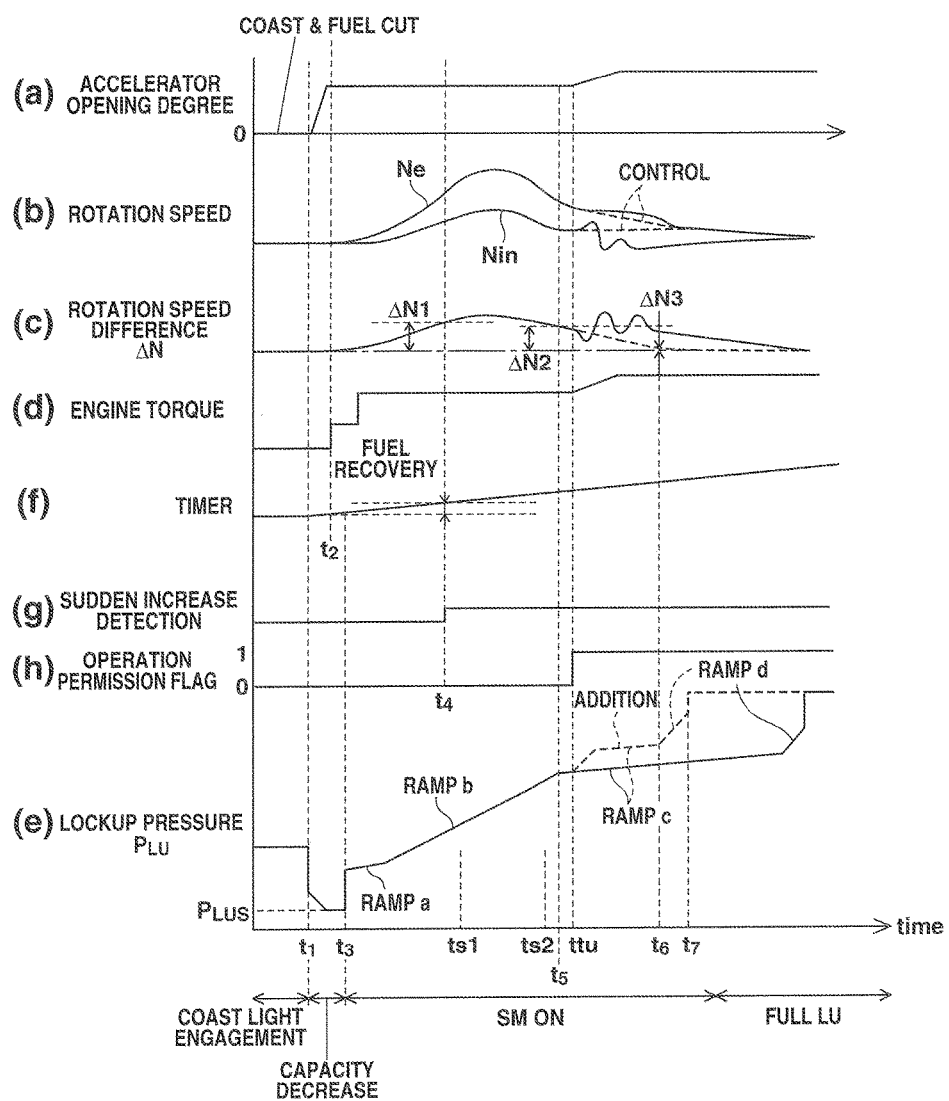
FIG. 3 is a time chart for explaining the control performed by the control device for the automatic transmission according to the one embodiment.
Figure 4:
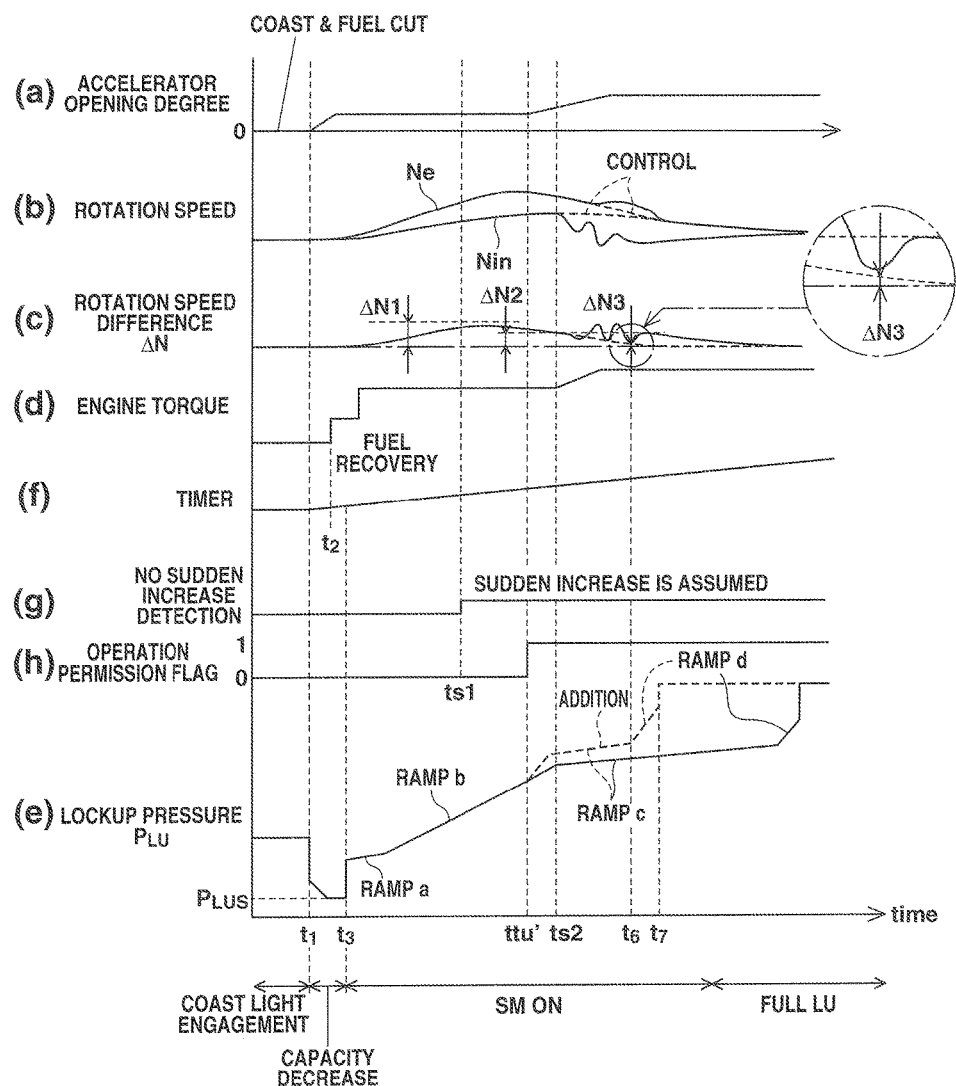
FIG. 4 is a time chart for explaining the control performed by the control device for the automatic transmission according to the one embodiment.

As shown in FIG. 3 and FIG. 4, when the judder avoidance control section 8a judges the increase of the engine torque in a case where the rotation speed difference ΔN becomes small, the judder avoidance control section 8a is configured to add the predetermined capacity to the engagement capacity (the torque transmission capacity) $C_{LU}$ of the lockup clutch 20 which is increased in the ramp state, and thereby to avoid the judder vibration.

In FIGS. 3 and 4, (a) shows the accelerator opening degree. (b) shows the engine speed Ne and the transmission input rotation speed Nin. (c) shows the rotation speed difference ΔN. (d) shows the engine torque. (e) shows the lockup pressure. (f) shows the timer value TM. (g) shows the detection state of the sudden increase of the rotation. (h) shows the actuation flag of the judder avoidance control. These shown to correspond the various control modes.

In the first judder avoidance control, as shown in FIG. 3 the rotation speed difference ΔN between the input and output elements of the torque converter 2 becomes equal to or greater than the first predetermined value ΔN1 (time $t_4$) within the time ts1 at which the predetermined time period (the first predetermined time period) is elapsed after the control start. The sudden increase of the speed of the engine 1 is judged. Then (in this case, after time ts2 at which the second predetermined time period is elapsed after the start of the control), the rotation speed difference ΔN becomes equal to or smaller than the second predetermined value ΔN2 (time $t_5$). When the engine torque is increased (the increase start time ttu), the actuation flag of the judder avoidance control is set. The predetermined pressure is added to the engagement pressure $P_{LU}$ of the lockup clutch which is increased in the ramp state. With this, the predetermined capacity is added to the torque transmission capacity which is also increased in the ramp state.

As shown in FIG. 4, in the second judder avoidance control, it is supposed that the speed of the engine 1 is suddenly increased at the ts1 at which the predetermined time period (the first predetermined time period) is elapsed after the start of the control although the rotation speed difference ΔN between the input and output elements of the torque converter 2 does not become equal to or greater than the first predetermined value ΔN1. Then, when the engine torque is increased (time ttu'), the actuation flag of the judder avoidance control is set. The predetermined pressure is added to the torque transmission capacity which is increased in the ramp state. With this, the predetermined capacity is added to the engagement capacity $C_{LU}$ of the lockup clutch 20.

Besides, in the predetermined capacity added to the engagement capacity $C_{LU}$ of the lockup clutch 20, it is preferable that the engagement capacity $C_{LU}$ becomes greater as the increase rate becomes greater in accordance with the increase of the engine torque at the judgment of the control, that is, based on the increase rate (the increase amount per the unit time) of the engine torque. In this case, the judgment of the control may be a control cycle in which the judgement of the control is performed. Moreover, the judgment of the control may be a representative value (average value or maximum value) of the plurality of the control cycles including the control cycle in which the judgment of the control is performed.

[1.2.3 Transmission Ratio Control of Variator]

As shown in FIG. 1, the CVTECU8 includes, as a functional element, a transmission gear ratio control section 8I.

In this case, the control of the transmission gear ratio of the variator 4 relating to the drive lockup by the transmission gear ratio control section 8I is explained. Besides, this control is performed when the control condition is satisfied. The control is not limited to the timing after the cancel of the coast lockup.

Figure 5:
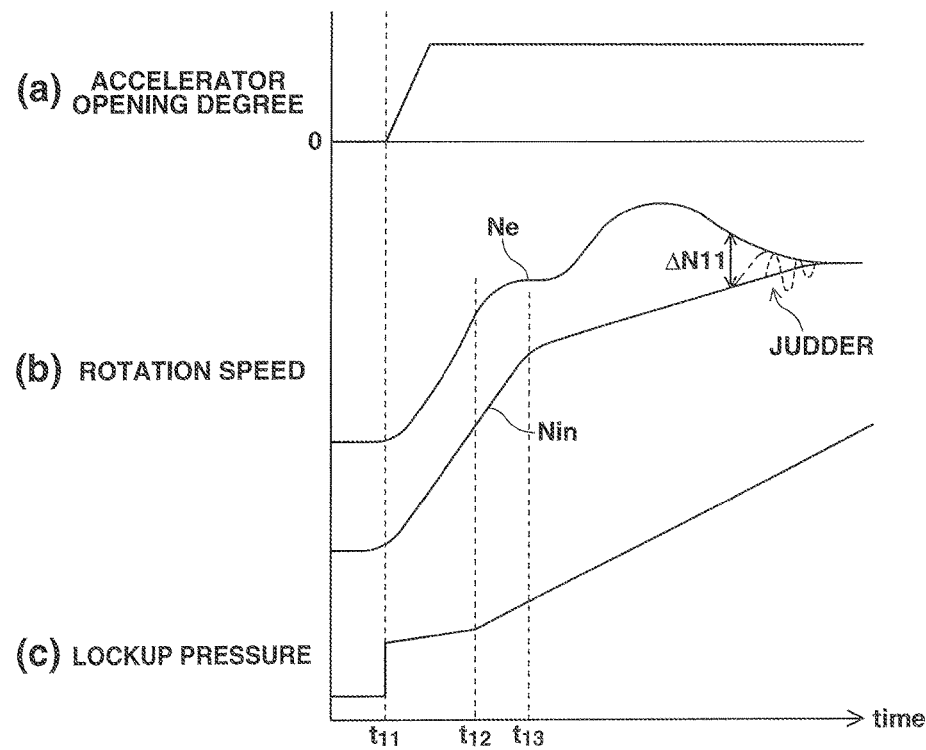
FIG. 5 is a time chart for explaining the control performed by the control device for the automatic transmission according to the one embodiment.

In this control, for example, in the start of the vehicle in the torque converter state, when the accelerator is switched to the ON state at time t11 as shown in FIG. 5, the engine rotation speed Ne is increased to hold the lowest state of the variator 4 in the torque converter state. Simultaneously, the lockup pressure $P_{LU}$ is increased in the ramp state. At time t12 at which the engine speed is increase to a certain degree, the lockup clutch 20 is slip-engaged, so that the engine speed Ne is temporarily slowdown. At time t13, the transmission input rotation speed (the turbine rotation speed) Nin and the engine rotation speed Ne are closer to each other while the transmission gear ratio of the variator 4 is controlled to the lowest toward the high side.

When the variator 4 is upshifted in accordance with the increase of the transmission input rotation speed Nin, the increase of the transmission input rotation speed Nin is suppressed. The engagement control of the lockup clutch 20 decreases the engine speed Ne toward the transmission input rotation speed Nin. Accordingly, the torque increase function of the torque converter 2 is largely varied, so that the engine load is largely varied. Consequently, when the judder vibration is generated as shown in FIG. 5. That amplitude becomes large.

Figure 6:
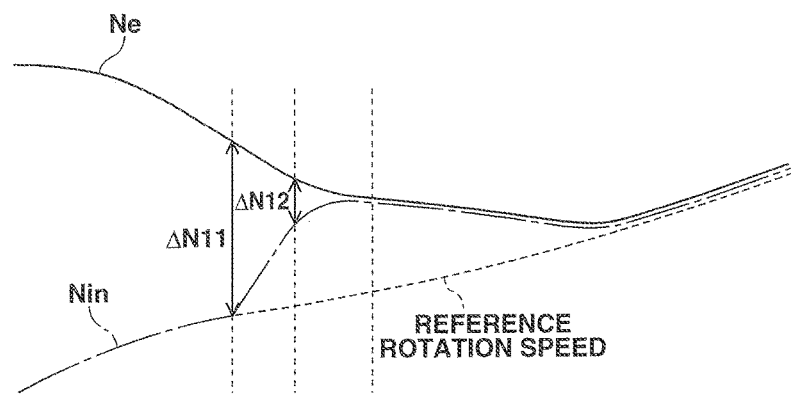
FIG. 6 is a time chart for explaining the control performed by the control device for the automatic transmission according to the one embodiment.

Therefore, the transmission gear ratio control section 8I performs the following control for suppressing the increase of the amplitude of the vibration even when the judder vibration is generated. As shown in FIG. 6, the transmission gear ratio control section 8I is configured to downshift the variator 4 when the rotation speed difference ΔN becomes equal to or smaller than the predetermined value Δ11, to increase the rotation of the transmission input rotation speed Nin, and to decrease the rotation speed difference ΔN when preventing the decrease of the engine speed Ne. When the rotation speed difference ΔN is decreased to be equal to or smaller than the predetermined value ΔN12 which is sufficiently smaller than the predetermined value Δ11, the decrease variation rate of the rotation speed difference ΔN is decreased so as to suppress the inertia shock at the full engagement.

In this case, the predetermined value ΔN11 is set in accordance with the variation speed (dΔN/dt) of the rotation speed difference ΔN.

That is, in a case where the decrease speed of the rotation speed difference ΔN is slow, the increase of the amplitude at the generation of the judder vibration is relatively small. It is possible to suppress the increase of the amplitude of the judder vibration even when the downshift is performed after the rotation speed difference ΔN becomes small to a certain degree. However, in a case where the decrease speed of the rotation speed difference ΔN is fast, the increase of the amplitude at the generation of the judder vibration becomes relatively large.

Accordingly, it is necessary to perform the downshift control from a timing at which the rotation speed difference ΔN is relatively large.

In this case, the variation of the rotation speed difference ΔN is the decrease variation. Accordingly, the variation speed (dΔN/dt) becomes negative value. The predetermined value ΔN11 is set to a larger value as the magnitude (absolute value) of the variation speed (dΔN/dt) becomes greater, that is, as the decrease speed of the rotation speed difference ΔN is faster. Besides, the predetermined value ΔN11 may be a fixed value.

Besides, when the recovery shock suppression control (the first engagement control) is performed, the judder vibration suppression control performed by the transmission gear ratio control by which the variator 4 is downshifted is prohibited. The judder vibration suppression control performed by the transmission gear ratio control is for a case where the lockup is controlled from the state where the rotation speed difference ΔN is relatively large. Accordingly, the judder vibration suppression control presupposes that the rotation speed difference ΔN is large to a certain degree. On the other hand, the recovery shock suppression control is configured to temporarily bring the lockup clutch 20 from the coast lockup state to the slip engagement, and then to fully engage the lockup clutch 20. At this time, the rotation speed difference ΔN is slight. Conversely, when the transmission gear ratio control of the judder vibration suppression is performed to be superimposed on the recovery shock suppression control, the control becomes unstable. Therefore, the judder vibration suppression control is prohibited at the recovery shock suppression control.

[2. Operations and Effects]

The control device for the automatic transmission according to the one embodiment of the present invention is constituted as described above. Accordingly, for example, as shown by a flowchart of FIG. 7, the control device performs the control of the lockup clutch 20. Besides, the flowchart of FIG. 7 is started by a key switch-on operation of the vehicle and so on, repeated at a predetermined control cycle, and finished by a key switch-off operation.

F in the flowchart of FIG. 7 is a control flag relating to the recovery shock suppression control. When the control flag F is 0, the recovery shock suppression control is not performed (operation non-permission). When the control flag is 1 to 3, the recovery shock suppression control is performed (operation permission). Moreover, the control flag=1 represents that the rotation difference ΔN is equal to smaller than the first predetermined value ΔN1. The control flag=2 represents that the rotation difference ΔN is equal to smaller than the first predetermined value ΔN1. The control flag=3 represents that the rotation difference ΔN becomes equal to greater than the first predetermined value ΔN1.

As shown in FIG. 7, firstly, it is judged whether or not the control flag F is 0 (step S10). When the control flag F is 0, it is judged whether or not the current state is during the fuel cut and during the coast lockup (step S20). When the current state is during the fuel cut and during the coast lockup, it is judged whether or not the accelerator is switched to the ON state during this control cycle (step S30). When it is judged that the current state is not during the fuel cut and during the coast lockup at step S20, or when it is judged that the accelerator is not switched to the ON state at step S30, the process is returned to wait for the next control cycle.

When the accelerator ON is judged at step S30, the fuel recovery (the fuel injection start) is performed (step S40). It is judged whether or not the recovery shock suppression control condition is satisfied, that is, whether or not the vehicle speed at the cancel of the coast lockup is equal to or smaller than a predetermined vehicle speed (step S50). When the recovery shock suppression control condition is satisfied, it is judged whether or not the hydraulic system is in a state where the oil vibration is generated (step S60).

When it is judged that the hydraulic system is not in the state where the oil vibration is generated at step S60, the control flag F is set to 1 (step S70). The timer count is started (step S80). The decrease control (the lockup pressure decrease control) of the engagement capacity of the lockup clutch 20 of the recovery shock suppression control is started (step S90). It is judged whether or not the timer count value TM reaches a set value TM0 according to the set time after the start of the recovery shock suppression control (step S100).

When the recovery shock suppression condition is not satisfied, or when it is judged that hydraulic system is in the state where the oil vibration is generated, the control process is returned to wait for the next control cycle.

Moreover, the lockup pressure decrease control performs the decrease of the lockup pressure until the time count value TM reaches the set value TM0 in accordance with a predetermined time schedule. During this, the process carries out step S10, S110, S80, S90, and S100.

It is judged that the timer count value TM reaches TM0 by the judgment of step S100, the control flag is set to 2 (step S120). The timer count is performed (step S130). The increase control (the lockup pressure increase control) of the engagement capacity of the lockup clutch 20 of the recovery shock suppression control is started (step S140). The lockup pressure increase control performs the increase of the lockup pressure in accordance with a predetermined schedule.

The transmission gear ratio of the variator to suppress the increase of the amplitude at the generation of the judder vibration is prohibited (step S150). It is judged whether or not the control flag is 2 (step S160). When the control flag F is 2, it is judged whether or not the timer count value TM is smaller than the set value TM1 according to the first predetermined time period after the start of the recovery shock suppression control (step S170).

When the timer count value TM is smaller than the set value TM1, it is judged whether or not the rotation speed difference Δ between the input and output elements of the lockup clutch 20 is equal to or greater than the first predetermined value ΔN1 (step S180).

When the control flag F is set to 2, the process proceeds through steps S10, S110, S130, S140, S150, and S160 to step S170.

In the supposition of the lockup pressure increase control (In the lockup pressure increase control, the following are supposed), the speed of the engine 1 is suddenly increased so that the rotation speed difference ΔN becomes equal to or greater than the first predetermined value ΔN1. When the timer count value TM is equal to or greater than the set value TM2 according to the second predetermined time period after the start of the suppression control, the rotation speed difference ΔN becomes equal to or smaller than the second predetermined value ΔN2.

When it is not judged that the rotation speed difference ΔN becomes equal to or greater than the first predetermined value ΔN1, the process is returned to wait for the next control cycle. When it is judged that the rotation speed difference ΔN is equal to or greater than the first predetermined value ΔN1, the control flag is set to 3 (step S190). The process proceeds to step S200.

After the control flag is set to 3 at step S180, at the next control cycle, the process proceeds through the step S10, S110, S130, S140, S150, and S160 to step S210.

At step S210, it is judged whether or not the rotation speed difference ΔN between the input and output rotations of the lockup clutch 20 is decreased to be equal to or smaller than the second predetermined value ΔN2.

It is judged that the rotation speed difference ΔN is decreased to be equal to or smaller than the second predetermined value ΔN2, it is judged whether or not the accelerator opening degree APO is equal to or greater than the predetermined value APO1 (step S220). When the accelerator opening degree APO is equal to or greater than the predetermined value APO1, it is judged whether or not the engine torque is increased (step S230). In this case, when it is judged that the engine torque is increased, that is, when the accelerator opening degree APO is equal to or greater than the predetermined value APO1 and the engine torque is increased, the control (the first judder avoidance control) is performed to add the pressure according to the increase of the engine torque to the lockup pressure $P_{LU}$, and to add the predetermined capacity to the torque transmission capacity of the lockup clutch 20 (step S240).

When it is not judged that the rotation speed difference ΔN is decreased to be equal to or smaller than the second predetermined value ΔN2 at step S210, when it is judged that the accelerator opening degree APO is not equal to or greater than the predetermined value APO1 at step S220, or when it is judged that the engine torque is not increased at step S230, the process is returned to wait for the next control cycle.

After the operation of step S240 is performed, the process proceeds to step S250.

On the other hand, at step S170, when it is judged that the timer count value TM is not smaller than the set value TM1 according to the first predetermined time period after the start of the recovery shock suppression control, that is, when the rotation speed difference ΔN does not become equal to or greater than the first predetermined value ΔN1 and the predetermined time period is elapsed after the start of the recovery shock suppression control, the process proceeds to step S280. It is judged whether or not the accelerator opening degree APO is equal to or greater than the predetermined value APO2.

When the accelerator opening degree APO is equal to or greater than the predetermined value APO2, it is judged whether or not the engine torque is increased (step S290). In this case, when it is judged that the engine torque is increased, that is, when the accelerator opening degree APO is equal to or greater than the predetermined value APO2 and the engine torque is increased, the control (the second judder avoidance control) is performed to add the pressure according to the increase of the engine torque to the lockup pressure $P_{LU}$, and to add the predetermined capacity to the torque transmission capacity of the lockup clutch 20 (step S300).

When it is judged that the accelerator opening degree APO is not equal to or greater than the predetermined value APO2 at step S280, and when it is judged that the engine is not increased at step S290, the process proceeds to step S250.

At step S250, it is judged whether or not the rotation speed difference ΔN between the input and output rotation elements of the lockup clutch 20 is decreased to be equal to or smaller than the third predetermined value ΔN3. When the rotation speed difference ΔN becomes equal to or smaller than the third predetermined value ΔN3, the process proceeds to step S260. At step S260, the lockup pressure is switched to the ramp d (the increase rate) by which it is not torn away (the rotation speed difference ΔN between the input and output elements of the lockup clutch 20 is not increased) even when the excessive torque of the engine 1 is inputted. After the predetermined time period is elapsed after the switching to the ramp d, the engagement pressure $P_{LU}$ is increased in the stepped state so that the engagement pressure $P_{LU}$ is controlled to the full engagement pressure. The process proceeds to step S270. At step S270, the control flag F is reset to 0. The timer is stopped and reset to 0.

In this way, when the output torque of the engine is increased in a state where the rotation speed difference ΔN between the input and output elements of the lockup clutch 20 becomes small after the rotation of the engine 1 is suddenly increased at the recovery shock suppression control (the first engagement control), the vibration (the judder vibration) may be generated due to the variation (the increase and the decrease of the frictional force) of the frictional state between the input and output elements. However, in this control device, the predetermined capacity is added to the torque transmission capacity of the lockup clutch 20 in the above-described state. With this, the variation of the frictional state is suppressed to avoid the generation of the judder vibration. The lockup clutch 20 is smoothly locked up.

Moreover, in a case where the output torque of the engine 1 is increased in a state where the rotation of the engine 1 is sufficiently increased, that is, in a state where the rotation speed difference ΔN between the input and output elements of the lockup clutch 20 does not become large to be closer to each other, the vibration (the judder vibration) may be generated due to the variation (the increase and the decrease of the frictional force) of the frictional state between the input and output elements. However, in this control device, the predetermined capacity is added to the torque transmission capacity of the lockup clutch 20. Accordingly, the variation of the frictional state is suppressed to avoid the judder vibration. The lockup clutch 20 is smoothly locked up.

[3. Others]

Hereinabove, the embodiment according to the present invention is explained. However, the present invention is not limited to the above-described embodiment. It is possible to implement by including various variations or by employing a part of the embodiment as long as it is not deviated from the present invention.

In the above-described embodiment, the recovery suck shock suppression control (the first engagement control) and the judder avoidance control (the second engagement control) as the engagement control of the lockup clutch 20 are performed with the transmission gear ratio of the judder vibration suppression. However, in a case where the recovery shock suppression control (the first engagement control) as the engagement control of the lockup clutch 20 is merely performed with the transmission gear ratio control of the judder vibration suppression, the prohibition control is applicable.

The invention claimed is:

1. A control device for an automatic transmission including a continuously variable transmission mechanism, an input element disposed between an internal combustion engine being a driving source of a vehicle and the continuously variable transmission, and arranged to rotate as a unit with the internal combustion engine, an output element arranged to rotate as a unit with an input shaft of the continuously variable transmission, and a torque converter having a lockup clutch disposed between the input element and the output element, the control device comprising:
   at least one electronic control unit configured to control an engagement state of the lockup clutch and a transmission gear ratio of the continuously variable transmission mechanism in accordance with a traveling state of the vehicle;
   a rotation sensor configured to sense a rotation speed difference between the input and output elements of the lockup clutch; and
   a torque sensor configured to sense an output torque of the internal combustion engine;
   the at least one electronic control unit being configured to
      perform a transmission gear ratio control to control the transmission gear ratio such that a rotation speed of the output element becomes closer to a rotation speed of the internal combustion engine when the sensed rotation speed difference sensed by the rotation sensor becomes equal to or smaller than a predetermined value in a case where the lockup clutch is switched through a slip engagement to a full engagement,
      perform a first engagement control to be brought to a full engagement state after the rotation of the internal combustion engine is increased in a slip engagement state while a torque transmission capacity of the lockup clutch is increased when the lockup clutch is switched through the slip engagement state to the full engagement state by an ON operation of an accelerator of the vehicle,
      the transmission gear ratio control being prohibited during the first engagement control, and
      the transmission gear ratio control being permitted when the first engagement control is not performed.

2. The control device for the automatic transmission as claimed in claim 1, wherein the electronic control unit is further configured to:
   judge when the torque sensor senses the increase of the output torque of the internal combustion engine; and
   perform a second control to add a predetermined capacity to the increased torque transmission capacity when judging an increase of the output torque of the internal combustion engine in a state where a sensed rotation speed difference sensed by the rotation sensor during the first engagement control is increased to be equal to or greater than a first predetermined value after a start of the control, and then decreased to be equal to or smaller than a second predetermined value smaller than the first predetermined value.

3. The control device for the automatic transmission as claimed in claim 1, wherein the first engagement control is a control to temporarily switch the lockup clutch to the slip engagement state by the ON operation of the accelerator from the coast lockup state of the vehicle, and then to return the full engagement state by increasing the torque transmission capacity of the lockup clutch.

4. The control device for the automatic transmission as claimed in claim 2, wherein the second engagement control is a control to add a predetermined capacity to the increased torque transmission capacity when judging the increase of the torque after a predetermined time period in a case where the increase of the sensed rotation speed difference to the first predetermined value or more is not generated during a predetermined time period after a start of the first engagement control.

5. The control device for the automatic transmission as claimed in claim 2, wherein the predetermined capacity is set in accordance with an increase state of the torque.

6. The control device for the automatic transmission as claimed in claim 1, wherein the electronic control unit is configured to:
   perform the first engagement control; and
   when the sensed rotation speed difference becomes equal to or smaller than a third predetermined value further increase an increase rate of the increased torque transmission capacity, such that rotation speed difference between the input and output elements of the lockup clutch is not decreased even when an output of the internal combustion engine becomes maximum.

7. The control device for the automatic transmission as claimed in claim 2, wherein the electronic control unit is configured to:
   perform the second engagement control; and
   when the sensed rotation speed difference becomes equal to or smaller than a third predetermined value smaller than the second predetermined value, further increase an increase rate of the increased torque transmission capacity, such that rotation speed difference between the input and output elements of the lockup clutch is not decreased even when an output of the internal combustion engine becomes maximum.

8. A control method for an automatic transmission including a continuously variable transmission mechanism, an input element disposed between an internal combustion engine being a driving source of a vehicle and the continuously variable transmission, and arranged to rotate as a unit with the internal combustion engine, an output element arranged to rotate as a unit with an input shaft of the continuously variable transmission, and a torque converter having a lockup clutch disposed between the input element and the output element, the control method comprising:
   sensing a rotation speed difference between the input and output elements of the lockup clutch;
   sensing an output torque of the internal combustion engine;

performing a transmission gear ratio control to control the transmission gear ratio so that a rotation speed of the output element becomes closer to a rotation speed of the internal combustion engine when the sensed rotation speed difference becomes equal to or smaller than a predetermined value in a case where the lockup clutch is switched through a slip engagement to a full engagement;

performing a first engagement control to be brought to the full engagement state after the rotation of the internal combustion engine is increased in the slip engagement state while a torque transmission capacity of the lockup clutch is increased when the lockup clutch is switched through the slip engagement state to the full engagement state by an ON operation of an accelerator of the vehicle;

prohibiting the transmission gear ratio control during the first engagement control; and permitting the transmission gear ratio control when the first engagement control is not performed.

* * * * *